March 28, 1944.  N. H. COPP  2,344,970
ANTISKID DEVICE FOR THE TIRES OF MOTOR VEHICLE WHEELS
Filed June 18, 1942   3 Sheets-Sheet 1
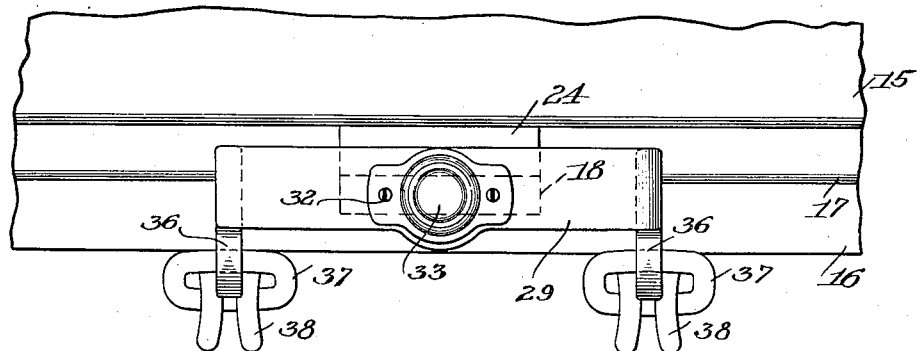
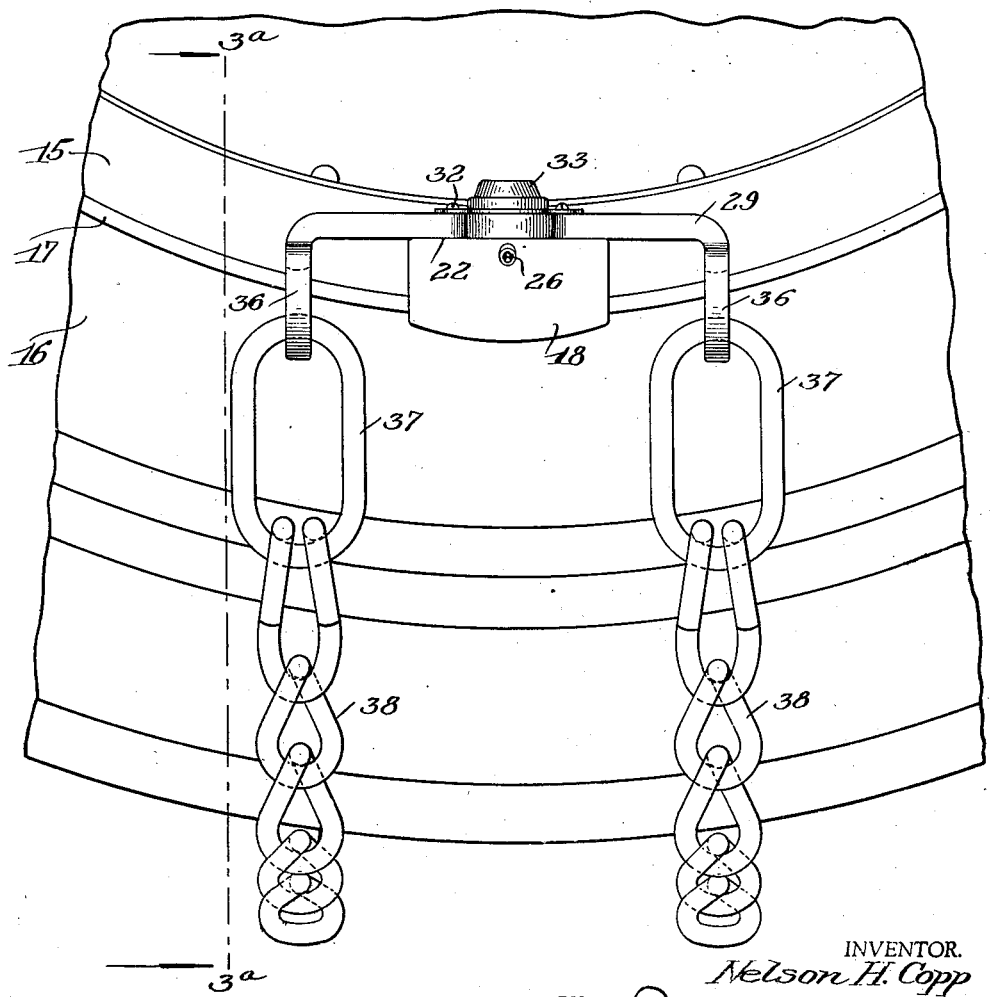
INVENTOR.
Nelson H. Copp
BY
his Attorneys

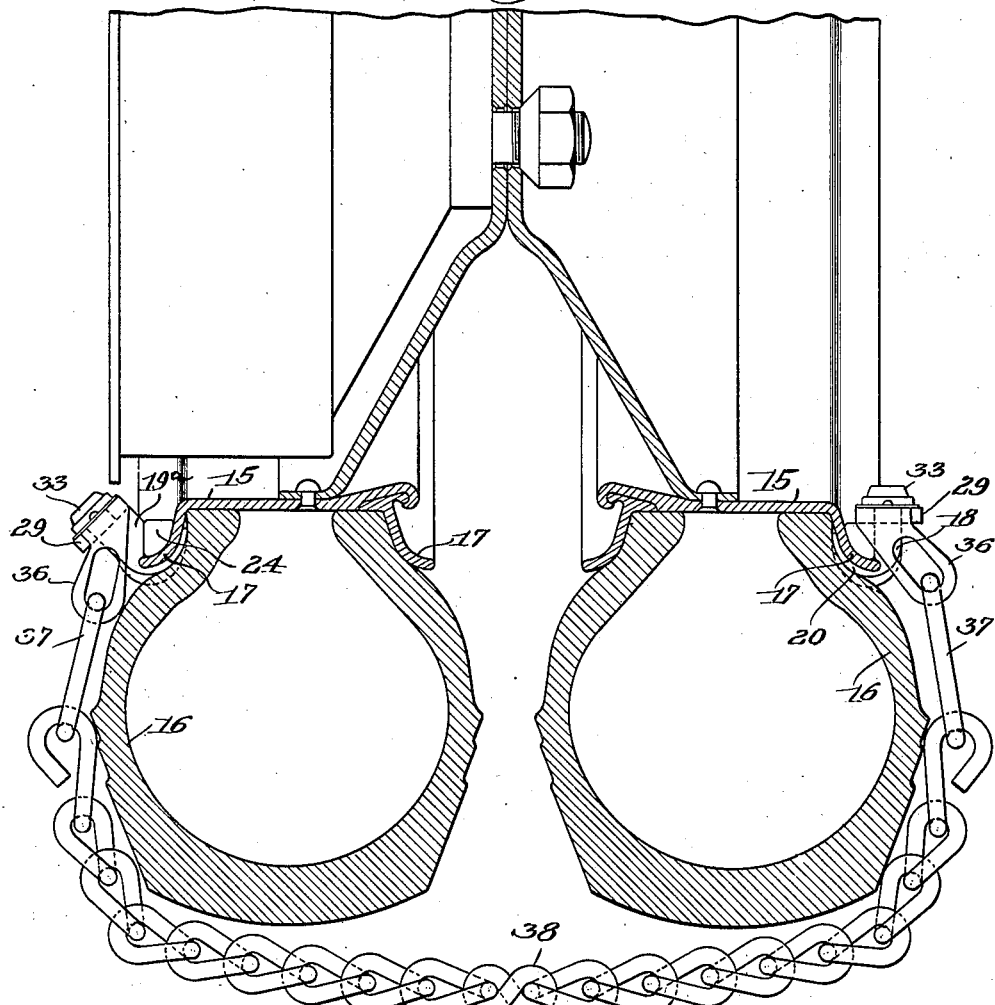
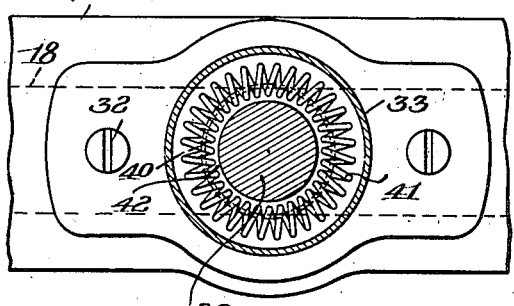
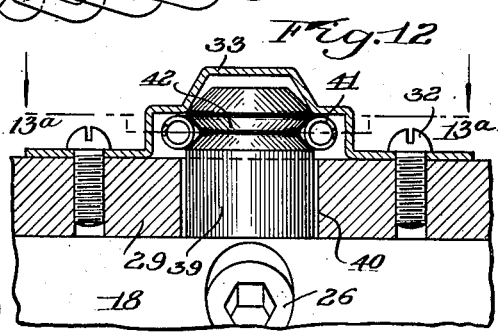

March 28, 1944.  N. H. COPP  2,344,970
ANTISKID DEVICE FOR THE TIRES OF MOTOR VEHICLE WHEELS
Filed June 18, 1942  3 Sheets-Sheet 3
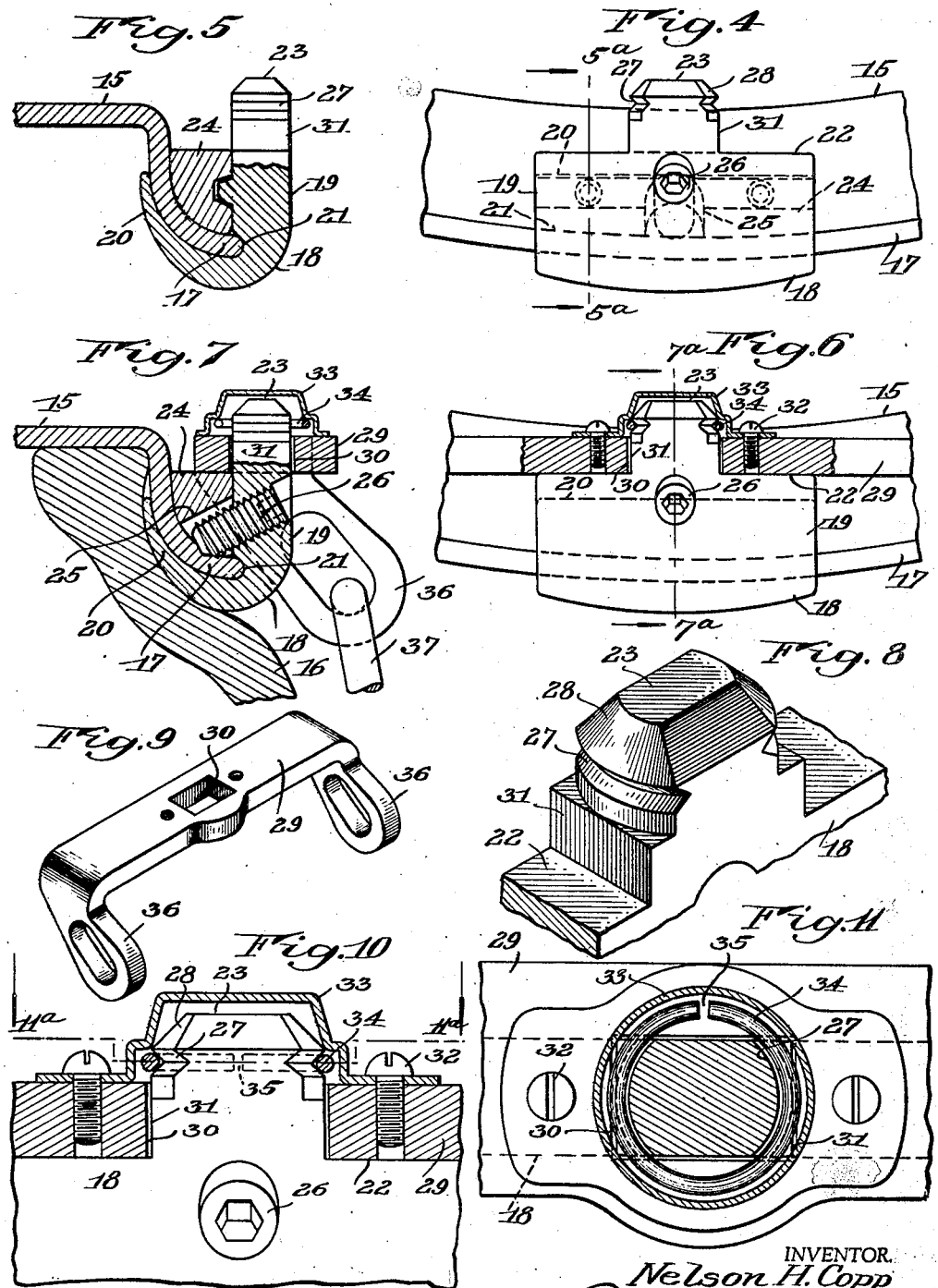
INVENTOR.
Nelson H. Copp
BY Cumpston & Shepard
His Attorneys Patented Mar. 28, 1944

2,344,970

UNITED STATES PATENT OFFICE 2,344,970

ANTISKID DEVICE FOR THE TIRES OF MOTOR VEHICLE WHEELS

Nelson H. Copp, Rochester, N. Y., assignor of one-half to Harold J. Nagle and one-half to Reginald A. Nagle, both of Rochester, N. Y.

Application June 18, 1942, Serial No. 447,512

4 Claims. (Cl. 152—233)

This invention relates to antiskid devices for the tires of motor vehicle wheels to increase their grip and traction on the road. The extent of use of such devices depends to a sustantial degree upon the amount of work involved in attaching and removing the same, as road conditions may require, and upon the extent to which it may be necessary for the motorist to soil his hands and clothing in such work. These difficulties in the use of the device have been progressively increased by the trend in design of motor vehicles, including the increased projection of fender and other body parts over the wheels. One object of the invention is to provide an improved device of the above character capable of being more readily and easily attached and removed and with less soiling of the hands and clothing.

Another object is to provide a device of the above character having a more simple and economical type of construction and one in which the attaching parts are housed and protected against clogging by ice and mud, so as to remain in condition to be easily and quickly operated.

To these and other ends the invention resides in certain improvements and combinations of parts, all as will be hereinafter more fully described, the novel features being pointed out in the claims at the end of the specification.

In the drawings:

Fig. 1 is a plan view of a device embodying the present invention as viewed looking radially outward from the center of the wheel and with the wheel portions broken away;

Fig. 2 is a side elevation of the same;

Fig. 3 is a sectional view on the line 3a—3a in Fig. 2;

Fig. 4 is an enlarged view of the wheel rim clamp shown in Fig. 2, attached to the rim, with other parts removed;

Fig. 5 is a sectional view on the line 5a—5a in Fig. 4;

Fig. 6 is a view similar to Fig. 4, showing also, partly in section, an anchoring member for the cross chains;

Fig. 7 is a sectional view on the line 7a—7a in Fig. 6;

Fig. 8 is an enlarged perspective of portions of the wheel rim clamp;

Fig. 9 is an enlarged perspective of portions of the anchoring member for the cross chains;

Fig. 10 is an enlargement of parts shown in Fig. 6;

Fig. 11 is a section on the line 11a—11a in Fig. 10;

Fig. 12 is a view similar to Fig. 10 of a slightly modified construction, and

Fig. 13 is a sectional view on the line 13a—13a of Fig. 12.

The present invention provides an antiskid device of the variety comprising one or more separate cross chains or groups of chains adapted for attachment directly to the periphery of automobile wheels at a plurality of points spaced about the circumference, such as disclosed in the patent to Peter J. Nagle, No. 2,171,592, on which the present invention is an improvement. The patented construction comprises a plurality of separate bodies clamped to the outer edges of the usual "drop" rim, each clamp body having means for the detachable association therewith of an anchoring member for the end or ends of one or more traction increasing elements or chains extending across the tread of the tire. In the patented construction the means for attaching the anchoring member to the rim clamp comprises a pivoted lever and auxiliary parts for manual adjustment to and from engagement with a cooperating part on the clamp, such parts being open and exposed to the accumulation of ice and dirt, with a tendency to become clogged thereby, as well as to soil the hands of the motorist in manipulating the same.

The present invention provides an improved construction for more easily and quickly attaching and detaching the cross chain anchoring member and the rim clamp, with less soiling of the operator. Referring more particularly to the drawings, the usual "drop" type wheel rim is shown at 15, on which is received the tire 16. The rim has on each side of the wheel the usual edge portion 17 extending radially outward and away from the plane of the wheel, as shown, and as well understood in the art.

In the preferred embodiment, the present device comprises a one-piece, forged steel clamp body 18, Figs. 4 to 8, inclusive, shaped to extend around the edge of the rim, with an outer part 19 located on the outer side of the rim edge and an inner part 20 engaging the inner side of the rim. Intermediate the parts 19 and 20, the clamp body is shaped with a groove, as at 21, to fit and receive the edge of the rim, as shown. The outer part 19 extends somewhat inwardly radially of the wheel and has a substantial length circumferentially thereof, as shown, with a flat seat portion, or surface 22, facing inwardly toward the wheel axis. Adjacent the center of this seat, the body has a post-like lug 23 extending radially inward of the wheel, for receiving the member for anchoring the cross chains, as more fully described hereafter.

The inner part 20 of the clamp body is preferably curved to conform generally to and lie against the inner surface of the edge portion of the rim and is tapered to a relatively thin edge at its inner extremity, as shown. This clamp body preferably comprises also an auxiliary part 24 shaped for reception between the outer clamp body 19 and the outer surface of the rim, with opposite sides conforming, respectively, to each. Part 24 is preferably notched to slidably receive a rib on the part 19, as shown, to hold part 24 in place and is centrally notched as at 25 to loosely embrace a set screw 26 threadedly engaging an opening in part 19 and adapted to be screwed inwardly to engage at its inner end with the outer surface of the rim, for drawing the inner part 20 of the clamp body in clamping engagement with the rim, as shown in Fig. 7.

In applying the clamp body 18, the tire is pressed back from the edge of the rim, with such deflation as may be desirable, and the body is fitted to the rim, as described above, and as shown in Figs. 5 and 7. The auxiliary part 24 is inserted between the rim and the outer part 19 at one end of the latter and slid into position and the screw 26 inserted and tightened against the rim to securely clamp the body thereto.

One or more such clamp bodies are applied to each rim edge. As used on single wheels or tires, a pair of such clamp bodies are attached opposite each other on the opposite inner and outer edges of the rim, in position for receiving the opposite ends of one or more chains extending across the tread of the tire. When used on double wheels or tires, a pair of such clamp bodies are attached to opposite outer sides, one to each of the two rims, with the cross chain or chains embracing both tires, as shown in Fig. 3. In such an arrangement the outer part of one of the clamp bodies may be inclined somewhat away from the plane of the wheel as at 19a, to afford clearance of an adjacent brake drum.

The lug, or post, 23, on the clamp body preferably has a circular recess, or groove, 27, cut into it laterally, at least on opposite sides, to provide at the outer side of the groove a laterally projecting shoulder, and the lug has a somewhat beveled or pointed outer end 28, as shown in Fig. 8, for a purpose explained thereafter. In especially strong constructions, as for chains for trucks, the lug is formed with a greater dimension circumferentially of the rim than transversely thereof, as shown in Fig. 8, only the opposite sides which face circumferentially are rounded and formed with the recess 27.

The anchoring member comprises preferably a generally U-shaped bar, a yoke, 29, Figs. 7 and 9, adapted to rest upon the seat 22 of the clamp body and upon the top of its auxiliary part 24, the member 29 being formed for this purpose with an opening 30 adapted to receive therein the lug 23 of the clamp body. Opening 30 preferably has a loose fit about a rectangular base portion 31 of lug 23, adjacent the seat 22, for maintaining the alinement of yoke 29, the top of which lies below recess 27 in the lug.

To provide means for cooperation with the lug 23 to detachably secure the cross chain anchoring member thereto, the side of yoke 29 opposite seat 22 has fixed thereto, as by means of screws 32, a circular, closed sheet metal housing 33, Figs. 10 and 11, concentric with the opening 30. The housing is of sufficient size to avoid interference with lug 23 upon its insertion in the yoke and is sufficiently larger in diameter than the circular portion of the upper end of the lug to loosely receive a spring ring 34 of resilient wire, split, as at 35, to allow it to expand and retract. Ring 34 is of such size as to resiliently grip the lug in recess 27, but the diameters of the ring and housing are such that the ring may expand sufficiently to ride up out of the recess 27 of the lug, over the shoulder formed by the outer side of the recess, on to the full diameter of the lug, so as to free the ring from engagement.

It will thus be seen that the anchoring member, or yoke, 29, may be brought to engage the top of lug 23 in opening 30 of the yoke and then merely pressed downwardly to cause the beveled upper end of the lug to expand ring 34 and permit the bar to rest on the seat 22 of the clamping body 18, in which position the ring snaps into recess 27 and holds the yoke on the lug. To remove the yoke, it is merely necessary, however, to press it upwardly to cause ring 34 to expand and snap over the shouldered outer end of the lug and so release the yoke from attachment to the lug and the rim.

The anchoring member, or yoke, 29, is preferably formed at each end with outwardly inclined, apertured arms 36, with each of which is engaged the terminal link 37 of one end of a cross chain 38 extending across the tread of the tire and similarly secured at its opposite end to the opposite side of the same or another tire rim, as shown.

In Figs. 12 and 13 is shown a slightly modified and somewhat lighter construction in which the lug 39 is fully circular in shape, as well as the opening 40 in bar 29. The resilient ring, in this instance, is a continuous, coiled spring 41 loosely retained in housing 33 and arranged to be snapped into and out of recess 42 of the lug as yoke 29 is pressed on or off the lug. The full circular extent of the recess tends to increase its frictional grip which is counteracted by the easy rolling action of the coiled spring into and out of the recess so as to afford an easily operable attachment.

It will thus be seen that the invention accomplishes its objects. By a simple type of construction in which the only moving part is the snap ring, the member for anchoring the end of the cross chain element is secured to or released from the clamp body by the mere act of pressing it down over the lug of the clamp body, or pressing it up off the lug, so as to cause the spring ring to snap into or out of the recess of the lug. It will be understood that centrifugal force, due to rotation of the wheel, and also the tractive stresses, tend to hold the anchoring member or yoke, 29, impaled on the lug, the gripping action of the spring ring being sufficient to hold the parts engaged against all forces tending to lift the yoke off the lug.

On the other hand, the attachment and removal of the cross chains requires only the application of sufficient manual pressure to snap the ring out of the recess in the lug, so that attachment and removal of the chains is an extremely simple operation, quickly accomplished, without tools, without substantial force and with a minimum of handling of the parts and of soiling of the hands. Furthermore, the operative parts of the anchoring member are housed and protected against ice and mud, it being a simple matter to wipe clean the lug and seat on the clamp body before applying the chains. The clamping body, once applied, may be left on the wheels, and the cross chains attached or removed in the simple and easy manner described, so as to afford a maximum degree of usefulness for the chains.

While the invention has been described in connection with a preferred embodiment, such disclosure is intended by way of illustration, rather than by way of limitation, as it is contemplated that various modifications in the construction and arrangement of parts will readily occur to those skilled in the art, within the scope of the appended claims.

I claim:

1. An antiskid device for attachment to a tire receiving wheel rim having an outwardly inclined marginal edge portion, said device comprising an outer part for location on the outer side of said edge portion, an inner part for engagement with the inner side of said edge portion, screw threaded means engaging one of said parts for drawing the other of said parts into clamping engagement with said edge portion, a lug on said outer part formed with an outwardly projecting shoulder, an anchoring member having an opening therein for engagement over said lug, and resilient means associated with said member and opening and actuated by pressure against said lug for releasably engaging the same below said shoulder, said anchoring member having means for attachment to a traction increasing element extended across a tire on said wheel rim.

2. An antiskid device for attachment to a tire receiving wheel rim having an outwardly inclined marginal edge portion, said device comprising an outer part for location on the outer side of said edge portion, an inner part for engagement with the inner side of said edge portion, screw threaded means engaging one of said parts for drawing the other of said parts into clamping engagement with said edge portion, a lug on said outer part formed with an outwardly projecting shoulder, an anchoring member having an opening therein for engagement over said lug, and a spring ring associated with said member about said opening for embracing said lug below said shoulder, said member being engaged and released by mere pressure of said ring against said shoulder longitudinally of said lug, and said member having means for attachment to a traction increasing element extended across a tire on said wheel rim.

3. An antiskid device for attachment to a tire receiving wheel rim having an outwardly inclined marginal edge portion, said device comprising an outer part for location on the outer side of said edge portion, an inner part for engagement with the inner side of said edge portion, screw threaded means engaging one of said parts for drawing the other of said parts into clamping engagement with said edge portion, a lug on said outerpart formed with an outwardly projecting shoulder, an anchoring member having an opening therein for engagement over said lug, and having a housing thereon about said opening, and a spring ring enclosed in said housing for embracing said lug below said shoulder, said member being engaged and released by mere pressure of said ring against said shoulder longitudinally of said lug, and said member having means for attachment to a traction increasing element extended across a tire on said wheel rim.

4. An antiskid device for attachment to a tire receiving wheel rim having an outwardly inclined marginal edge portion, said device comprising an outer part for location on the outer side of said edge portion, an inner part for engagement with the inner side of said edge portion, screw threaded means engaging one of said parts for drawing the other of said parts into clamping engagement with said edge portion, a lug on said outer part projecting radially inward of said rim and laterally recessed to provide an outwardly projecting shoulder, an anchoring member having an opening therein for engagement over said lug, a closed housing on one side of said member concentric with said opening therein, and a resiliently expansible ring loosely retained in said housing for embracing said lug below said shoulder, said member being engaged and released by mere pressure of said ring against said shoulder longitudinally of said lug, and said member having means for attachment to a traction increasing element extended across a tire on said wheel rim.

NELSON H. COPP.